No. 868,060. PATENTED OCT. 15, 1907.
G. C. ZELLER.
SHEARS.
APPLICATION FILED APR. 20, 1906.
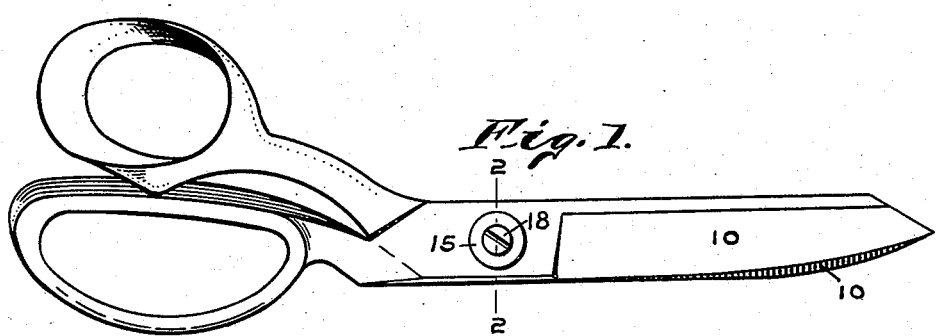
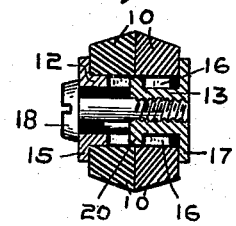
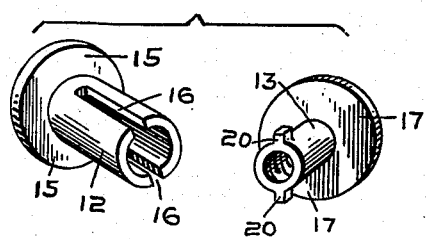
WITNESSES:
J. C. Dynes.
W<sup>m</sup> Hurte.
INVENTOR
George C. Zeller,
By Minturn & Toerner,
ATT'YS.

UNITED STATES PATENT OFFICE.

GEORGE C. ZELLER, OF TIFFIN, OHIO.

SHEARS.

No. 868,060.  Specification of Letters Patent.  Patented Oct. 15, 1907.

Application filed April 20, 1906. Serial No. 312,855.

*To all whom it may concern:*

Be it known that I, GEORGE C. ZELLER, a citizen of the United States, residing at Tiffin, in the county of Seneca and State of Ohio, have invented certain new and useful Improvements in Shears, of which the following is a specification.

This invention relates to improvements in scissors and shears, and has for its object a means for increasing the efficiency of the pivot that connects the two blades together, so that when said blades have once been set in proper cutting relation, said relationship can be maintained.

I accomplish the objects of my invention by the mechanism illustrated in the accompanying drawings, in which Figure 1 is a side elevation of a pair of shears embodying my invention. Fig. 2 is a transverse sectional view on the dotted line 2—2 in Fig. 1. Fig. 3 is a perspective view of the telescopic cylindrical sleeves that jointly form the pivot for the blades of the shears.

In the drawing, 10 represents the blade members that jointly form the scissors or shears. These blades are each provided with a transverse aperture which registers when the parts are assembled. The pivot on which the blades 10 operate and by which they are held together, is formed by means of a plurality of telescopic cylindrical sleeves 12 and 13, which are inserted into the transverse apertures in the blades 10. The sleeve 12 is the first one inserted into the apertures in the blades 10, and the diameter of said sleeve corresponds with the bore of said apertures. The sleeve 12 is provided with the integrally formed head 15 which provides a shoulder for limiting its insertion into the blades 10. The length of the sleeve 12 is slightly less than the combined transverse diameters of the blades 10, in order that the parts may be tightened.

The secondary sleeve 13 is provided with an integrally formed head 17, that corresponds to the head 15 on the sleeve 12, and forms a shoulder for limiting the insertion of said sleeve into the blades 10. The external diameter of the sleeve 13 corresponds with the internal diameter of the longitudinal aperture in the sleeve 12, and is inserted into the latter sleeve when the parts to form the pivot for the shears are assembled.

When assembling the blades 10, the sleeves 12 and 13 are telescoped together, and a screw 18 is passed first through the sleeve 12, and then screwed into the sleeve 13, which has internal threads to receive the threaded end of said screw 18. Thus the blades 10 may be brought together until a perfect cutting edge between them is secured, and can be so maintained.

To prevent individual movement of either of the sleeves 12 and 13, which would cause separation of the blades 10 through use, and thereby impair the efficiency of the tool, I provide the sleeve 12 with the longitudinal slots 16, arranged diametrically opposite each other in the wall of said sleeve. The sleeve 13 on its exterior surface is provided with integrally formed lugs 20, which are arranged diametrically opposite each other and are of a diameter equaling the width of the longitudinal slots 16 in the sleeve 12. The arrangement of the slots 16 and the lugs 20 is such as to cause them to register before the sleeves can be telescoped together, and when the two sleeves are assembled, a single member is practically the result. The lengths of the lugs 20 are considerably less than the length of the longitudinal slots 16, so that when the parts are assembled the unoccupied portions of the slots 16 form chambers for the retainment of oil or similar lubricants. See Fig. 2. The sleeves are now clamped together by means of the screw 18 and are thus prevented from separating when acted upon by the blades 10. Should the movement of the blades during the operation of cutting so act upon the sleeves to cause any rotation, the sleeves will rotate as a unit and thereby remove the possibility of separation.

Having thus fully described my said invention, what I desire to secure by Letters Patent of the United States, is—

In a pair of shears, a pair of blades provided with registering holes, a pivot comprising two hollow sections telescoped together, each being provided on its outer end with an annular shoulder, one of said pivot forming sections provided with longitudinal slots and the other with laterally projecting lugs which occupy a portion of the longitudinal slots in the second scetion, and a screw-bolt passing through both hollow sections of the pivot and adapted to hold said sections together.

In witness whereof, I, have hereunto set my hand and seal at Tiffin, Ohio, this 16th day of April, A. D. one thousand nine hundred and six.

GEORGE C. ZELLER. [L. S.]

Witnesses:
MARY BELL PARK,
CLYDE C. PORTER.